United States Patent
Lee

(10) Patent No.: US 8,645,018 B2
(45) Date of Patent: Feb. 4, 2014

(54) SYSTEM AND METHOD FOR DETERMINING OIL CHANGE TIMING OF AUTOMATIC TRANSMISSION

(75) Inventor: Dong Soo Lee, Gyeonggi-do (KR)

(73) Assignee: Continental Automotive Systems Corporation, Gyeonggi-Do (KR)

( * ) Notice: Subject to any disclaimer, the term of this patent is extended or adjusted under 35 U.S.C. 154(b) by 181 days.

(21) Appl. No.: 13/387,823

(22) PCT Filed: Jul. 28, 2010

(86) PCT No.: PCT/KR2010/004964
§ 371 (c)(1),
(2), (4) Date: Jan. 30, 2012

(87) PCT Pub. No.: WO2011/014007
PCT Pub. Date: Feb. 3, 2011

(65) Prior Publication Data
US 2012/0130606 A1     May 24, 2012

(30) Foreign Application Priority Data

Jul. 28, 2009    (KR) ........................ 10-2009-0069095

(51) Int. Cl.
*G06F 19/00* (2011.01)
*F16H 57/04* (2010.01)

(52) U.S. Cl.
USPC .......... 701/29.4; 701/29.5; 701/33.4; 701/51; 340/457.4

(58) Field of Classification Search
None
See application file for complete search history.

(56) References Cited

U.S. PATENT DOCUMENTS

| 4,677,847 A | | 7/1987 | Sawatari et al. |
| 5,559,494 A | * | 9/1996 | Thompson .................... 340/439 |
| 6,266,587 B1 | * | 7/2001 | Guertler et al. ............... 701/29.5 |
| 6,920,412 B1 | * | 7/2005 | Sarkar et al. .................. 702/181 |
| 2005/0131599 A1 | * | 6/2005 | Inagawa et al. ................. 701/29 |
| 2008/0228339 A1 | * | 9/2008 | Rains et al. ..................... 701/29 |

FOREIGN PATENT DOCUMENTS

| JP | 09-329222 | 12/1997 |
| JP | 2006-322587 | 11/2006 |
| KR | 1019990040777 A | 6/1999 |
| KR | 1020040021058 A | 3/2004 |

OTHER PUBLICATIONS

Korean Patent Office, Office Action of Korean Application No. 10-2009-0069095.

* cited by examiner

*Primary Examiner* — Michael J Zanelli
(74) *Attorney, Agent, or Firm* — Laurence A. Greenberg; Werner H. Stemer; Ralph E. Locher

(57) ABSTRACT

A system and method for determining the time to change the oil of an automatic transmission includes: continuously tracing/storing oil change-related information, which serves as a basis for an oil change, from the point of time when new automatic transmission oil is provided, such as the point in time of a new car purchase or the point in time of an automatic transmission oil change; determining whether or not it is time to change the oil of the automatic transmission on the basis of the oil change-related information, a preset change reference value, an oil temperature reference value, a recommended vehicle travel mileage and the like. When it is determined to be the time to change the oil of the automatic transmission, an automatic transmission oil change signal is generated to inform a driver of the necessity of changing the oil of the automatic transmission.

7 Claims, 2 Drawing Sheets

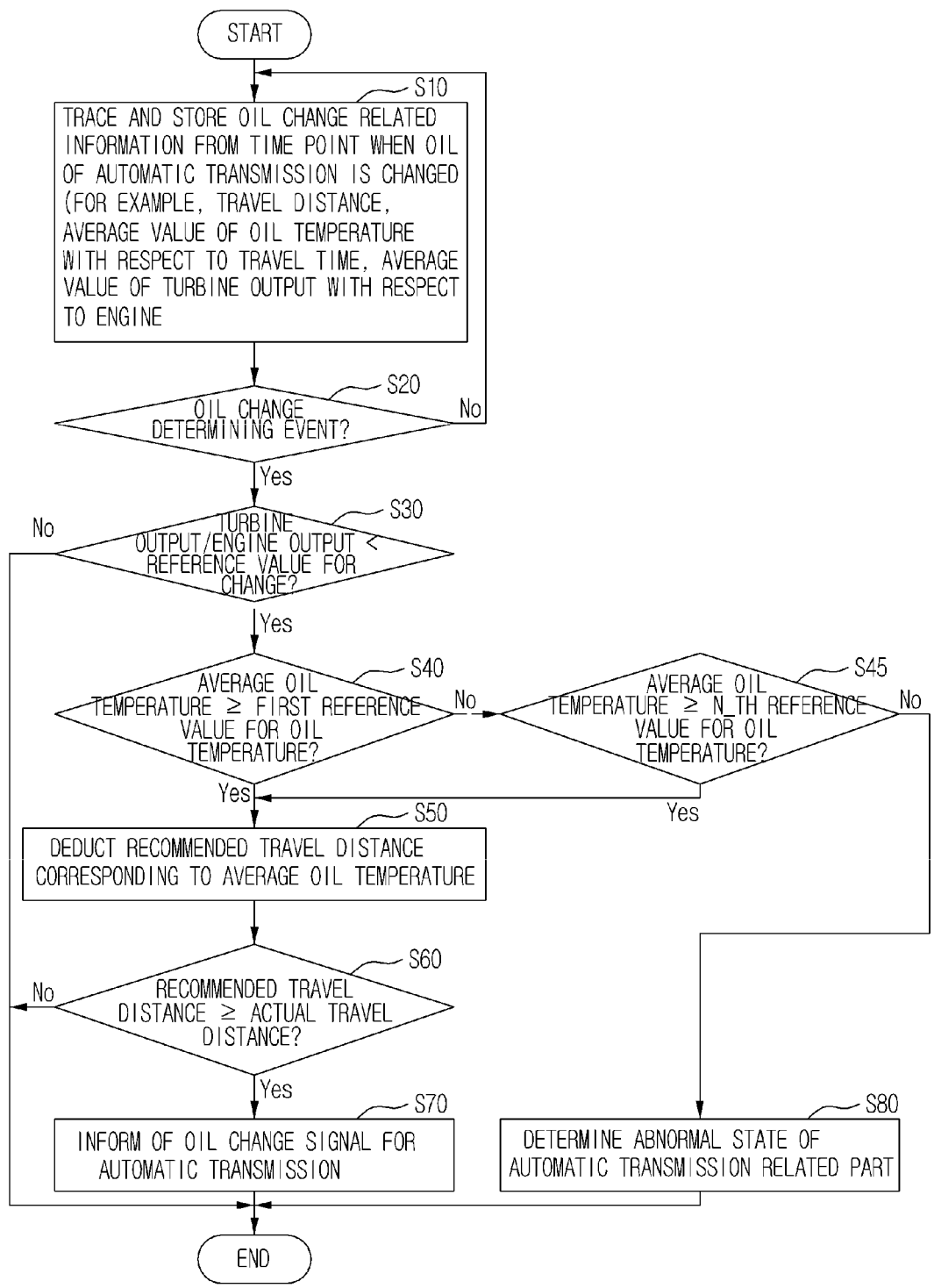

SYSTEM AND METHOD FOR DETERMINING OIL CHANGE TIMING OF AUTOMATIC TRANSMISSION

BACKGROUND OF THE INVENTION

1. Field of the invention

The present invention relates to a system and a method for determining an oil change timing of an automatic transmission. More particularly, the present invention relates to a system and a method for determining an oil change timing of an automatic transmission by which a conventional inconvenience of a driver subjectively considering or determining an oil change timing when the driver determines the oil change timing of an automatic transmission can be improved.

2. Description of the Prior Art

In general, in a vehicle equipped with an automatic gearshift function, if a driver pushes an accelerator pedal to generate an acceleration input, an engine control unit (ECU) controlling an engine recognizes it, the engine control unit (ECU) controls a fuel injection of an engine according to the acceleration input to control a drive of the engine, and a transmission control unit (TCU) in communication with the engine control unit (ECU) controls a torque converter converting an output of the engine according to the acceleration input and a transmission unit, so that a conversion of the acceleration according to an input of the accelerator pedal can be automatically achieved.

An oil of an automatic transmission should be changed at a proper time before it is time-worn and reaches a time when it cannot perform its function.

Meanwhile, conventionally, an oil of an automatic transmission can be changed by a driver directly checking a state of an oil according to a manual, or checking a travel distance and a travel environment after a new oil is injected into the automatic transmission, i.e. after a new car is purchased or an oil of the automatic transmission is changed. Accordingly, in the conventional method of changing an oil of an automatic transmission, since there is no separate unit for informing of a need for an oil change of the automatic transmission, there is no objective basis for an oil change. Therefore, a driver cannot but rely on a continuous concern and a subjective determination which has not been processed.

SUMMARY OF THE INVENTION

Accordingly, the present invention has been made to solve the above-mentioned problems occurring in the prior art, and an aspect of the present invention provides a method of determining an oil change timing of an automatic transmission, the method including the steps of: tracing and storing oil change related information serving as a basis for an oil change from a time point when a new car is purchased or an oil of an automatic transmission is previously changed; if a specific event of determining an oil change of the automatic transmission occurs, determining an average value of a turbine output with respect to an engine output among the stored oil change related information is less than a preset reference value for change; if the average value of a turbine output with respect to an engine output is less than the preset reference value for change, determining whether an average value of an oil temperature with respect to a travel time among the stored oil change related information is more than at least one preset reference value for oil temperature; if the average value of an oil temperature with respect to a travel time a is more than the at least one preset reference value for oil temperature, deducting a preset recommended travel distance corresponding to the average value of an oil temperature with respect to a travel time; and if the travel distance among the stored oil change related information is more than the deducted recommended travel distance, determining that the current time is an oil change timing of the automatic transmission and informing a driver of an oil change signal for the automatic transmission, whereby a conventional inconvenience of a drive subjectively considering and determining an oil change timing can be improved.

The present invention also provides a system for determining an oil change timing of an automatic transmission, the system including: an output unit for displaying a specific message or outputting a guide voice; and a control unit for tracing and storing oil change related information serving as a basis for an oil change from a time point when a new car is purchased or an oil of an automatic transmission is previously changed, for, if a specific event of determining an oil change of the automatic transmission occurs, when an average value of a turbine output with respect to an engine output is less than a preset reference value for change, determining whether an average value of an oil temperature with respect to a travel time among the oil change related information is more than at least one preset reference value for oil temperature, for, if the average value of an oil temperature with respect to a travel time a is more than the at least one preset reference value for oil temperature, deducting a preset recommended travel distance corresponding to the average value of an oil temperature with respect to a travel time, and, for, if the travel distance among the stored oil change related information is more than the deducted recommended travel distance, determining that the current time is an oil change timing of the automatic transmission and controlling the output unit to inform a driver of an oil change signal for the automatic transmission, whereby a conventional inconvenience of a drive subjectively considering and determining an oil change timing can be improved.

According to an exemplary embodiment, there is provided a method of determining an oil change timing of an automatic transmission, the method including the steps of: tracing and storing oil change related information serving as a basis for an oil change from a time point when a new car is purchased or an oil of an automatic transmission is previously changed; if a specific event of determining an oil change of the automatic transmission occurs, determining an average value of a turbine output with respect to an engine output among the stored oil change related information is less than a preset reference value for change; if the average value of a turbine output with respect to an engine output is less than the preset reference value for change, determining whether an average value of an oil temperature with respect to a travel time among the stored oil change related information is more than at least one preset reference value for oil temperature; if the average value of an oil temperature with respect to a travel time a is more than the at least one preset reference value for oil temperature, deducting a preset recommended travel distance corresponding to the average value of an oil temperature with respect to a travel time; and if the travel distance among the stored oil change related information is more than the deducted recommended travel distance, determining that the current time is an oil change timing of the automatic transmission and informing a driver of an oil change signal for the automatic transmission.

Preferably, the method further includes the step of: storing the reference value for change corresponding to a ratio of a turbine output to an engine output in a state where the oil of the automatic transmission is required to be changed, the at least one reference value for oil temperature serving as a reference for a travel allowable distance with respect to an average maintainable oil temperature recommended in correspondence to the oil of the automatic transmission, and the at least one recommended travel distance corresponding to the travel allowable distance with respect to an average maintainable oil temperature recommended in correspondence to the oil of the automatic transmission.

Here, the average value of a turbine output with respect to an engine output used in the step of determining whether the average value of the average value of a turbine output with respect to an engine output is less than the preset reference value for change is an average value of an turbine output with respect to an engine output which is stored immediately before a lock-up clutch is operated, based on an average value of a turbine output with respect to an engine output stored based on an engine output and a turbine output in a state where a transmission unit to be gear-shifted automatically is in the highest gear step.

Here, the step of informing the driver comprises the step of displaying a message informing the driver of an oil change signal for the automatic transmission or outputting a guide voice informing the driver of an oil change signal for the automatic transmission.

the method further includes the step of: if the average value of an oil temperature with respect to a travel time is less than all the at least one preset reference value for oil temperature, determining that the average value of a turbine output with respect to an engine output being less than the reference value for change is caused by an abnormal state of an automatic transmission related part.

According to another exemplary embodiment, there if provided a system for determining an oil change timing of an automatic transmission, the system including: an output unit for displaying a specific message or outputting a guide voice; and a control unit for tracing and storing oil change related information serving as a basis for an oil change from a time point when a new car is purchased or an oil of an automatic transmission is previously changed, for, if a specific event of determining an oil change of the automatic transmission occurs, when an average value of a turbine output with respect to an engine output is less than a preset reference value for change, determining whether an average value of an oil temperature with respect to a travel time among the oil change related information is more than at least one preset reference value for oil temperature, for, if the average value of an oil temperature with respect to a travel time is more than the at least one preset reference value for oil temperature, deducting a preset recommended travel distance corresponding to the average value of an oil temperature with respect to a travel time, and, for, if the travel distance among the stored oil change related information is more than the deducted recommended travel distance, determining that the current time is an oil change timing of the automatic transmission and controlling the output unit to inform a driver of an oil change signal for the automatic transmission.

The control unit determines, when the average value of an oil temperature with respect to a travel time is less than all the at least one preset reference value for oil temperature, that the average value of a turbine output with respect to an engine output being less than the reference value for change is caused by an abnormal state of an automatic transmission related part.

Accordingly, the system and method for determining an oil change timing of the automatic transmission according to the present invention continuously trace and store oil change related information serving as a basis for an oil change from a time point when a new car is purchased or a time point when a new oil is injected into the automatic transmission, i.e. an oil of the automatic transmission is previously changed, determine whether the current time is an oil change timing of the automatic transmission based on oil change related information, a preset reference value for change, a reference value for oil temperature, and a recommended travel distance, and inform a driver of an oil change signal for informing of an oil change timing of the automatic transmission when the current time is an oil change timing, whereby the driver can recognize that an oil of the automatic transmission is required to be changed.

Accordingly, since the system for determining an oil change timing of the automatic transmission according to the present invention informs a drives of a need for an oil change of the automatic transmission in case of an oil change timing, it allows the driver to change an oil of the automatic transmission at an accurate timing without directly checking a travel distance and a travel environment and subjectively determining an oil change timing.

BRIEF DESCRIPTION OF THE DRAWINGS

The above and other objects, features and advantages of the present invention will be more apparent from the following detailed description taken in conjunction with the accompanying drawings, in which:

FIG. 2 is a control flowchart of a method of determining an oil change timing of an automatic transmission according to an embodiment of the present invention.

DETAILED DESCRIPTION OF THE PREFERRED EMBODIMENTS

Figure 1:
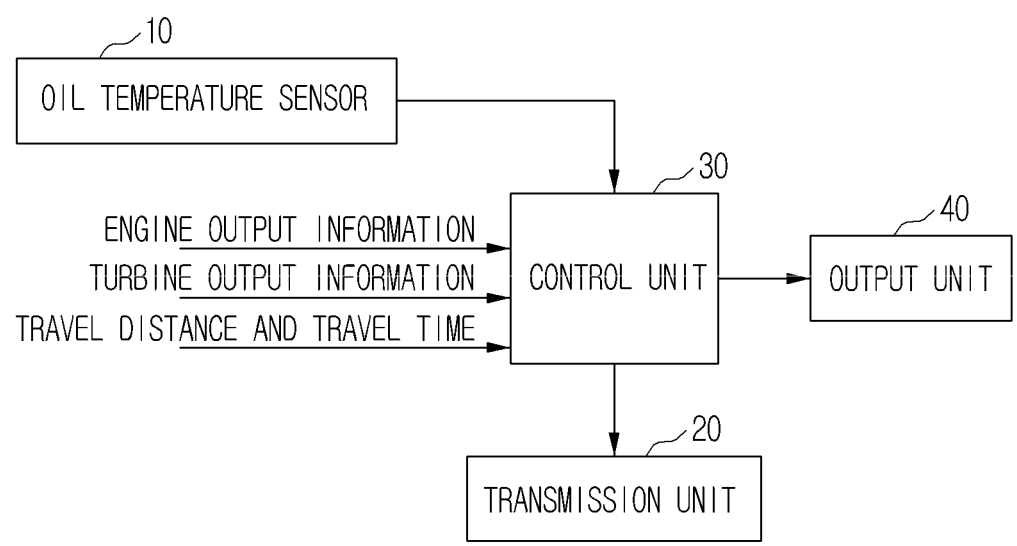
FIG. 1 is a control block diagram of a system for determining an oil change timing of an automatic transmission according to an embodiment of the present invention.

Hereinafter, a system for determining an oil change timing of an automatic transmission according to an embodiment of the present invention will be described with reference to FIG. 1.

As illustrated in FIG. 1, the system for determining an oil change timing of an automatic transmission according to an embodiment of the present invention includes an output unit 40 for displaying a specific message or outputting a guide voice, and a control unit 30 for receiving engine output information, turbine output information, and various vehicle state information such as a travel distance and a travel time from the outside, including oil temperature information provided from an oil temperature sensor 10 for sensing a temperature of an oil of an automatic transmission.

Here, the control unit 30 is a controller for controlling an automatic gear-shift and may be a transmission control unit (TCU) serving to control automatic transmission related parts. When the control unit 30 is a transmission control unit (TCU), the control unit 30 will control a transmission unit 20 through communication (CAN communication, serial communication, or the like) with an engine control unit (ECU).

In a more detailed description of the process of the control unit 30 determining an oil change timing of the automatic transmission, the control unit 30 traces and stores oil change related information serving as a basis for an oil change from a time point when a new car is purchased or an oil of an automatic transmission is previously changed, determines, if a specific event of determining an oil change of the automatic transmission occurs, when an average value of a turbine output with respect to an engine output is less than a preset reference value for change, whether an average value of an oil temperature with respect to a travel time among the oil change related information is more than at least one preset reference value for oil temperature, deducts, if the average value of an oil temperature with respect to a travel time a is more than the at least one preset reference value for oil temperature, a preset recommended travel distance corresponding to the average value of an oil temperature with respect to a travel time, and, determines, if the travel distance among the stored oil change related information is more than the deducted recommended travel distance, that the current time is an oil change timing of the automatic transmission and controls the output unit 40 to inform a driver of an oil change signal for the automatic transmission.

First, the control unit 30 configured to receive various vehicle state information including oil temperature information continuously traces and stores oil change related information serving as a basis for an oil change from a time point when a new car is purchased or an oil of the automatic transmission is previously changed. Here, the oil change related information includes a travel distance, a travel time, an average value of an oil temperature with respect to a travel time, and an average value of a turbine output with respect to an engine output after a new oil is injected into the automatic transmission, i.e. from a time point when a new car is purchased or an oil of the automatic transmission is previously changed.

That is, after storing a travel distance at a time point when a new oil is injected into the automatic transmission, i.e. at a time point when a new car is purchased or an oil of the automatic transmission is previously changed, the control unit 30 traces and stores a travel distance and a travel time after the time point.

The control unit 30 calculates an average value of an oil temperature with respect to a travel time after a time point when a new oil is injected into the automatic transmission based on oil temperature information amount various vehicle state information, and stores it. Then, it is desirable to calculate and store an average value of an oil temperature with respect to a travel time with the assumption that there is no misdiagnosis related to an oil temperature of the oil of the automatic transmission.

The control unit 30 calculates and stores an average value of a turbine output with respect to an engine output after a time point when a new oil is injected into the automatic transmission, based on engine output information and turbine output information among the received various vehicle state information. That is, the control unit 30 calculates an average value of a turbine output with respect to an engine output based on engine output information and turbine output information in a state where a lock-up clutch is not operated, there is not misdiagnosis in relation to an error in communication with the engine control unit (ECU) and a turbine, and the transmission unit 20 to be gear-shifted automatically, and stores it. The control unit 30 calculates a corresponding average value of a turbine output with respect to an engine output immediately before the lock-up clutch is operated in a state where the transmission unit 20 is at the highest gear step, based on the stored average value of a turbine output with respect to an engine output, and stores it.

The control unit 30 traces a preset learning value corresponding to a driving habit of a driver after a time point when a new oil is injected into the automatic transmission in addition to the travel distance, the travel time, the average value of an oil temperature with respect to a travel time, and the average value of a turbine output with respect to an engine output, and includes and stores it in the oil change related information.

In this way, the control unit 30 continuously traces and stores oil change related information serving as a basis for an oil change and determines whether a specific determination event of determining a change of an oil for the automatic transmission, from a time point when a new car is purchased or a new oil is injected into the automatic transmission such as a time point of changing the oil. Such a determination event may occur as a specific event (a start on/off etc.) is input periodically, continuously, at a specific time, or from the outside, and it is desirable to preset the determination event by a user.

Accordingly, if it is determined that a specific event for determining an oil change for the automatic transmission occurs, the control unit 30 determines whether an average value of a turbine output with respect to an engine output among the continuously stored oil change related information is less than a preset reference value for change. Here, the reference value for change is a preset value corresponding a ratio of a turbine output to an engine output in a state where an oil of the automatic transmission is required to be changed, and may correspond to a desirable experimental result where a ratio of a turbine output to an engine output in the state where the oil of the automatic transmission is required to be changed is obtained through an experiment.

Here, when the control unit 30 determines whether an average value of a turbine output with respect to an engine output is less than a preset reference value for change, it preferably uses an average value of a turbine output with respect to an engine output corresponding to a time point immediately before the lock-up switch is operated in a state where the transmission unit 20 is at the highest gear step among the continuously stored oil change related information.

Accordingly, if the control unit 30 determines that the average value of a turbine output with respect to an engine output is less than the present reference value for change, it determines an abnormal state in an output of a torque converter and determines whether the average value of an oil temperature with respect to a travel time among the oil change related information is more than the at least one preset reference value for oil temperature. Here, the at least one reference value for oil temperature is preferably an oil temperature value serving as a reference for a travel allowable distance with respect to an average maintainable oil temperature which is recommended by a manufacturer producing an oil for an automatic transmission. That is, the controller 30 stores a first reference value for oil temperature, a second reference value for oil temperature, . . . , a N-th reference value for oil temperature respectively serving as references for travel allowable distances with respect to an average maintainable oil temperature which are recommended in correspondence to the oil of the automatic transmission oil.

Accordingly, if an average value of an oil temperature with respect to a travel time among the oil change related information is more than any one of the first reference value for oil temperature, the second reference value for oil temperature, . . . , the N-th reference value for oil temperature (e.g. the first reference value for oil temperature), the control unit 30 deducts a preset recommended travel distance which is recommended in correspondence to an average value of an oil temperature. Here, the recommended travel distance is a recommended travel distance corresponding to a travel allowable distance with respect to an average maintainable oil temperature which is recommended by a manufacturer producing an oil for an automatic transmission, and the control unit 30 stores in advance at least one of a first recommended travel distance, a second recommended travel distance, . . . , a N-th recommended travel distance respectively corresponding to travel allowable distances with respect to an average maintainable oil temperature which are recommended in correspondence to the transmission oil.

Accordingly, the control unit 30 deducts a recommended travel distance (e.g. a first recommended travel distance) which is recommended in correspondence to the average value of an oil temperature, and determines whether a travel distance among the oil change related information, i.e. an actual travel distance from a time point when a new oil is injected into the automatic transmission is more than the deducted recommended travel distance.

When the actual travel distance is more than the deducted recommended travel distance, the control unit 30 determines that the current time is an oil change timing of the automatic transmission, and controls the output unit 40 to inform a driver of an oil change signal for the automatic transmission. Accordingly, the output unit 40 will display a message informing of an oil change signal for the automatic transmission for informing of an oil change timing of the automatic transmission or output a guide voice informing of an oil change signal for the automatic transmission.

Meanwhile, after the control unit 30 determines whether the average value of an oil temperature with respect to a travel time among the oil change related information is more than the at least one preset reference value for oil temperature (a first reference value for oil temperature, a second reference value for oil temperature, . . . , a N-th reference value for oil temperature), if the average value of an oil temperature with respect to a travel time is less than all the at least one preset reference value for oil temperature, the control unit 30 will determine that the average value of a turbine output with respect to an engine output being less than the reference value for change is caused by an abnormal state of an automatic transmission related part.

That is, when a travel distance is not long in spite that an output of the torque converter is more than an output lower than the reference value for change as the average value of a turbine output with respect to an engine output is less than the reference value for change, it will correspond to a case where it is doubted that the automatic transmission related part is in an abnormal state.

As mentioned above, the system for determining an oil change timing of the automatic transmission according to the present invention continuously traces and stores oil change related information serving as a basis for an oil change from a time point when a new car is purchased or a time point when a new oil is injected into the automatic transmission, i.e. an oil of the automatic transmission is previously changed, determines whether the current time is an oil change timing of the automatic transmission based on oil change related information, a preset reference value for change, a reference value for oil temperature, and a recommended travel distance, and informs a driver of an oil change signal for informing of an oil change timing of the automatic transmission when the current time is an oil change timing, whereby the driver can recognize that an oil of the automatic transmission is required to be changed.

Accordingly, since the system for determining an oil change timing of the automatic transmission according to the present invention informs a drives of a need for an oil change of the automatic transmission in case of an oil change timing, it allows the driver to change an oil of the automatic transmission at an accurate timing without directly checking a travel distance and a travel environment and subjectively determining an oil change timing.

Hereinafter, a control flow of a method of determining an oil change timing of an automatic transmission according to an embodiment of the present invention will be described with reference to FIG. 2. Here, the above-described construction of FIG. 1 will be referenced with its reference numerals for convenience' sake.

Basically, in the method of determining an oil change timing of an automatic transmission, a reference value for change (a ratio of an turbine output to an engine output in a state where an oil of an automatic transmission is required to be changed is preferably obtained through an experiment) which is preset in correspondence to a ratio of a turbine output to an engine output in a state where an oil of the automatic transmission is required to be changed, at least one reference value for oil temperature (a first reference value for oil temperature, a second reference value for oil change, . . . , an N-th reference value for oil temperature) serving as a reference for a travel allowable distance with respect to an average maintainable oil temperature which is recommended in correspondence to the oil of the automatic transmission, and at least one recommended travel distance (a first recommended travel distance, a second recommended travel distance, . . . , an N-th recommended travel distance) which is recommended in correspondence to the oil of the automatic transmission are stored in advance.

In the method of determining an oil change timing of an automatic transmission according to the present invention, oil change related information serving as a basis for an oil change is continuously traced and stored from a time point when a new car is purchased or an oil of the automatic transmission is changed (S10). Here, the oil change related information includes a travel distance, a travel time, an average value of an oil temperature with respect to a travel time, and an average value of a turbine output with respect to an engine output, from a time point when a new oil is injected into the automatic transmission, i.e. a time point when a new car is purchased or an oil of the automatic transmission is changed.

Preferably, the control unit 30 may store a travel distance at a time point when a new oil is injected into the automatic transmission, may trace and store a travel distance and a travel time from the time point, calculates and stores an average value of an oil temperature with respect to a travel time after a time point when a new oil is injected into the automatic transmission, and may calculate and store an average value of a turbine output with respect to an engine output. Further, the control unit 30 may trace a preset learning value corresponding to a driving habit of a driver after a time point when a new oil is injected into the automatic transmission in addition to the travel distance, the travel time, the average value of an oil temperature with respect to a travel time, and the average value of a turbine output with respect to an engine output, and may include and store it in the oil change related information.

Meanwhile, in the method of determining an oil change timing of an automatic transmission according to the present invention, it is determined whether a specific determination event for determining an oil change of the automatic transmission occurs (S20). Such a determination event may occur as a specific event (a start on/off etc.) is input periodically, continuously, at a specific time, or from the outside, and it is desirable to preset the determination event by a user. Accordingly, if it is determined that a specific event for determining an oil change for the automatic transmission occurs, it is determined whether an average value of a turbine output with respect to an engine output among the continuously stored oil change related information is less than a preset reference value for change (S30). Preferably, the control unit 30 will determine whether an average value of a turbine output with respect to an engine output is less than a preset reference value for change. Here, in the method of determining an oil change timing of an automatic transmission, when the control unit 30 determines whether an average value of a turbine output with respect to an engine output is less than a preset reference value for change, it preferably uses an average value of a turbine output with respect to an engine output corresponding to a time point immediately before the lock-up switch is operated in a state where the transmission unit 20 is at the highest gear step among the continuously stored oil change related information.

Accordingly, in the method of determining an oil change timing of an automatic transmission, if the control unit 30 determines that the average value of a turbine output with respect to an engine output is less than the present reference value for change, it determines an abnormal state in an output of a torque converter and determines whether the average value of an oil temperature with respect to a travel time among the oil change related information is more than the at least one preset reference value for oil temperature (S40 to S50). That is, the control unit 30 determines whether an average value of an oil temperature with respect to a travel time among the oil change related information is more than a first reference value for oil temperature (S40). If not, it is determined whether the average value of an oil temperature with respect to a travel time is more than a second reference value for oil temperature. If not, it is determined whether the average value of an oil temperature with respect to a travel time is more than a third reference value for oil temperature. Accordingly, it may be determined whether an average value of an oil temperature with respect to a travel time is more than an N-th reference value for oil temperature through sequential determinations.

Accordingly, in the method of determining an oil change timing of an automatic transmission, if it is determined that an average value of an oil temperature with respect to a travel time among the oil change related information is more than one of a first reference value for oil temperature, a second reference value for oil temperature, . . . , an N-th reference value for oil temperature (e.g. a first reference value for oil temperature), a preset recommended travel distance which is recommended in correspondence to an average value of an oil temperature is deducted (S50). Preferably, the control unit 30 will deduct the present recommended travel distance which is recommended in correspondence to an average value of an oil temperature.

Accordingly, in the method of determining an oil change timing of an automatic transmission, it is determined determines whether a travel distance among the oil change related information, i.e. an actual travel distance from a time point when a new oil is injected into the automatic transmission is more than the deducted recommended travel distance (e.g. a first recommended travel distance) corresponding to the average value of an oil temperature in step S50 (S60). Preferably, the control unit 30 will determine whether the actual travel distance is more than the recommended travel distance (e.g. a first recommended travel distance).

In the method of determining an oil change timing of an automatic transmission, when the actual travel distance is more than the deducted recommended travel distance, it is determined that the current time is a timing when an oil of the automatic transmission is required to be changed, and a drive is informed of an oil change signal for the automatic transmission for informing of an oil change timing of the automatic transmission (S70). That is, the output unit 40 under the control of the control unit 30 will display a message informing of an oil change signal for the automatic transmission for informing of an oil change timing of the automatic transmission or output a guide voice informing of an oil change signal for the automatic transmission.

Meanwhile, in the method of determining an oil change timing of an automatic transmission, if the average value of an oil temperature with respect to a travel time among the oil change related information is less than all the at least one preset reference value for oil temperature (a first reference value for oil temperature, a second reference value for oil temperature, . . . , an N-th reference value for oil temperature), it will be determined that the average value of a turbine output with respect to an engine output is caused by an abnormal state of the automatic transmission related part (S80).

That is, when a travel distance is not long in spite that an output of the torque converter is more than an output lower than the reference value for change as the average value of a turbine output with respect to an engine output is less than the reference value for change, it will correspond to a case where it is doubted that the automatic transmission related part is in an abnormal state.

As mentioned above, the method of determining an oil change timing of the automatic transmission according to the present invention continuously traces and stores oil change related information serving as a basis for an oil change from a time point when a new car is purchased or a time point when a new oil is injected into the automatic transmission, i.e. an oil of the automatic transmission is previously changed, determines whether the current time is an oil change timing of the automatic transmission based on oil change related information, a preset reference value for change, a reference value for oil temperature, and a recommended travel distance, and informs a driver of an oil change signal for informing of an oil change timing of the automatic transmission when the current time is an oil change timing, whereby the driver can recognize that an oil of the automatic transmission is required to be changed.

Accordingly, since the method of determining an oil change timing of the automatic transmission according to the present invention informs a drives of a need for an oil change of the automatic transmission in case of an oil change timing, it allows the driver to change an oil of the automatic transmission at an accurate timing without directly checking a travel distance and a travel environment and subjectively determining an oil change timing.

Although a specific embodiment of the present invention has been described and illustrated, It will be understood by those skilled in the art to which the present invention pertains that the present invention is not limited to the embodiment but various variations and modification can be made without departing from the spirit and scope of the present invention. Accordingly, the variations and modification should not be construed separately from the technical spirit or aspect of the present invention, and the modified embodiments also pertain to the scope of the present invention which is recited in the claims.

According to the system and method for determining an oil change timing of the automatic transmission according to the present invention which continuously trace and store oil change related information serving as a basis for an oil change from a time point when a new car is purchased or a time point when a new oil is injected into the automatic transmission, i.e. an oil of the automatic transmission is previously changed, determine whether the current time is an oil change timing of the automatic transmission based on oil change related information, a preset reference value for change, a reference value for oil temperature, and a recommended travel distance, and inform a driver of an oil change signal for informing of an oil change timing of the automatic transmission when the current time is an oil change timing, whereby the driver can recognize that an oil of the automatic transmission is required to be changed, since there can follow a great progress in aspects of convenience in management of the vehicle and the system and management efficiency of the automatic transmission, the vehicle to which the present invention is applied can be sufficiently distributed and sold and can be carried out clearly. Therefore, the present invention can be industrially applicable.

What is claimed is:

1. A method of determining an oil change timing of an automatic transmission, the method which comprises:
   tracing and storing oil change-related information serving as a basis for an oil change from a time point when a new car is purchased or an oil of an automatic transmission was previously changed;
   determining an average value of a turbine output with respect to an engine output among the stored oil change related information is less than a preset reference value for change, if a specific event of determining an oil change of the automatic transmission occurs;
   determining whether an average value of an oil temperature with respect to a travel time among the stored oil change-related information is more than at least one preset reference value for oil temperature, if the average value of a turbine output with respect to an engine output is less than the preset reference value for change;
   deducting a preset recommended travel distance corresponding to the average value of an oil temperature with respect to a travel time, if the average value of an oil temperature with respect to a travel time is more than the at least one preset reference value for oil temperature; and
   determining that the current time is an oil change timing of the automatic transmission and informing a driver of an oil change signal for the automatic transmission, if the travel distance among the stored oil change related information is more than the deducted recommended travel distance.

2. The method according to claim 1, which further comprises storing the reference value for change corresponding to a ratio of a turbine output to an engine output in a state where the oil of the automatic transmission is required to be changed, the at least one reference value for oil temperature serving as a reference for an allowable travel distance with respect to an average maintainable oil temperature recommended in correspondence with the oil of the automatic transmission, and the at least one recommended travel distance corresponding to the allowable travel distance with respect to an average maintainable oil temperature recommended in correspondence with the oil of the automatic transmission.

3. The method according to claim 1, which comprises using the average value of a turbine output with respect to an engine output in the step of determining whether the average value of the average value of a turbine output with respect to an engine output is less than the preset reference value for change is an average value of an turbine output with respect to an engine output that is stored immediately before a lock-up clutch is operated, based on an average value of a turbine output with respect to an engine output stored based on an engine output and a turbine output in a state where a transmission unit to be gear-shifted automatically is in a highest gear step.

4. The method according to claim 1, wherein the step of informing the driver comprises displaying a message informing the driver of an oil change signal for the automatic transmission or outputting an audible signal informing the driver of an oil change signal for the automatic transmission.

5. The method according to claim 4, which further comprises determining that the average value of a turbine output with respect to an engine output being less than the reference value for change is caused by an abnormal state of an automatic transmission-related part, if the average value of an oil temperature with respect to a travel time is less than the at least one preset reference value for oil temperature.

6. A system for determining an oil change timing of an automatic transmission, the system comprising:
   an output unit for displaying a specific message or outputting a guide voice; and
   a control unit for tracing and storing oil change related information serving as a basis for an oil change from a time point when a new car is first delivered or an oil of an automatic transmission is previously changed, for determining whether an average value of an oil temperature with respect to a travel time among the oil change-related information is more than at least one preset reference value for oil temperature, if a specific event of determining an oil change of the automatic transmission occurs, when an average value of a turbine output with respect to an engine output is less than a preset reference value for change, for deducting a preset recommended travel distance corresponding to the average value of an oil temperature with respect to a travel time , if the average value of an oil temperature with respect to a travel time is more than the at least one preset reference value for oil temperature, and, for determining that the current time is an oil change timing of the automatic transmission and controlling said output unit to inform a driver of an oil change signal for the automatic transmission if the travel distance among the stored oil change-related information is more than the deducted recommended travel distance.

7. The system according to claim 6, wherein said control unit is configured to determine, when the average value of an oil temperature with respect to a travel time is less than all the at least one preset reference value for oil temperature, that the average value of a turbine output with respect to an engine output being less than the reference value for change is caused by an abnormal state of an automatic transmission-related part.

* * * * *